(12) United States Patent
Yamaguchi et al.

(10) Patent No.: US 8,679,672 B2
(45) Date of Patent: Mar. 25, 2014

(54) FLAT BATTERY

(75) Inventors: Koji Yamaguchi, Otokuni-gun (JP); Toshihiko Ishihara, Otokuni-gun (JP)

(73) Assignee: Hitachi Maxell, Ltd., Ibaraki-shi, Osaka (JP)

( * ) Notice: Subject to any disclaimer, the term of this patent is extended or adjusted under 35 U.S.C. 154(b) by 136 days.

(21) Appl. No.: 13/581,748

(22) PCT Filed: Sep. 13, 2010

(86) PCT No.: PCT/JP2010/065741
§ 371 (c)(1),
(2), (4) Date: Aug. 29, 2012

(87) PCT Pub. No.: WO2011/111255
PCT Pub. Date: Sep. 15, 2011

(65) Prior Publication Data
US 2012/0321939 A1    Dec. 20, 2012

(30) Foreign Application Priority Data

Mar. 9, 2010  (JP) ................................. 2010-052215
Mar. 12, 2010 (JP) ................................. 2010-055511
Mar. 12, 2010 (JP) ................................. 2010-055646

(51) Int. Cl.
*H01M 6/12*  (2006.01)
*H01M 2/08*  (2006.01)

(52) U.S. Cl.
USPC .......................................... 429/162; 429/180

(58) Field of Classification Search
USPC ........................... 429/163–164, 162, 175, 176
See application file for complete search history.

(56) References Cited

U.S. PATENT DOCUMENTS

2008/0070109 A1    3/2008 Oka
2008/0248384 A1 *  10/2008 Yabushita et al. ............ 429/185

FOREIGN PATENT DOCUMENTS

JP    61-233964 A    10/1986
JP    61-233965 A    10/1986

(Continued)

OTHER PUBLICATIONS

International Search Report of PCT/JP2010/065741, mailing date Dec. 7, 2010.

(Continued)

*Primary Examiner* — Patrick Ryan
*Assistant Examiner* — Kiran Quraishi
(74) *Attorney, Agent, or Firm* — Westerman, Hattori, Daniels & Adrian, LLP

(57) ABSTRACT

Provided is a flat battery with a molded gasket extending from the opening edge of the seal can to the flat portion, where the gasket may be prevented from exfoliating from the inner surface of the seal can. A flat battery (1) includes: a negative electrode can (10) (exterior can) shaped as a cylinder with a bottom; a positive electrode can (20) (seal can) having a peripheral wall (22) (cylinder portion) and a flat portion (21), the positive electrode can being disposed as an inverted dish with respect to the negative electrode can (10); and a gasket (30) molded at least on an inner surface of the positive electrode can (20), extending from the opening edge of the peripheral wall (22) to the flat portion (21). The opening edge of the sidewall of the negative electrode can (10) is fitted onto the stepped portion (22*c*) of the positive electrode can (20), and a portion of the gasket (30) that is located inside the opening edge portion of the peripheral wall (22) of the positive electrode can (20) with respect to the positive electrode can has a thickness smaller than that of a portion of the gasket that is located inside the stepped portion (22*c*) of the positive electrode can (20) with respect to the positive electrode can.

9 Claims, 4 Drawing Sheets

(56) References Cited

FOREIGN PATENT DOCUMENTS

| | | | | |
|---|---|---|---|---|
| JP | 04-034837 A | | 2/1992 | |
| JP | 04-341756 A | | 11/1992 | |
| JP | 05-325925 A | | 12/1993 | |
| JP | 2002-056827 A | | 2/2002 | |
| JP | 2002056827 A | * | 2/2002 | .............. H01M 2/08 |
| JP | 2005-038674 A | | 2/2005 | |
| JP | 2007-213957 A | | 8/2007 | |
| JP | 2008-071612 A | | 3/2008 | |
| JP | 2008-078158 A | | 4/2008 | |
| JP | 2008-198552 A | | 8/2008 | |

OTHER PUBLICATIONS

Written Opinion of PCT/JP2010/065741, mailing date Dec. 7, 2010.

* cited by examiner

FLAT BATTERY

TECHNICAL FIELD

The present invention relates to flat batteries such as coin cells.

BACKGROUND ART

Flat batteries that include an exterior can shaped as a cylinder having a bottom and a seal can disposed to cover the opening of the exterior can and connected with the exterior can along its periphery are known. In such a flat battery, as disclosed in, for example, JP-Hei4(1992)-34837A and JP-Sho61(1986)-233965A, a gasket made of resin is disposed at the connection between the exterior can and the seal can to maintain air tightness in the battery and to ensure electrical isolation between the exterior can and the seal can.

JP-Hei4(1992)-34837A and JP-Sho61(1986)-233965A further disclose molding such a gasket on the peripheral wall of the seal can. Particularly, JP-Sho61(1986)-233965A discloses molding, on the peripheral wall of the seal can shaped as a cylinder having a bottom, a gasket that extends from the edge of the opening to the flat portion.

DISCLOSURE OF THE INVENTION

Generally, in a flat battery, the exterior can and the seal can are connected with each other by fitting the opening edge of the exterior can onto the stepped portion formed on the peripheral wall of the seal can. If, as in the configurations disclosed in JP-Hei4(1992)-34837A and JP-Sho61(1986)-233965A, a gasket of resin is molded around the peripheral wall of the seal can, a compression force is applied to the gasket molded on the seal can in the direction of the cylinder axis of the seal can when the opening edge of the exterior can is fitted onto the edge of the peripheral wall of the seal can.

Then, in a configuration where a gasket is molded on the inner surface of the seal can to extend from the opening edge to the flat portion, as in a configuration disclosed in JP-Sho61(1986)-233965A, the compression force applied to the gasket may cause a portion of the gasket located close to the flat portion of the seal can, which is thinner than the other portions, to exfoliate from the inner surface of the seal can. Thus, in some interior battery configurations, if a portion of the gasket exfoliates, a short circuit may occur between the electrode assembly and the seal can, or the exfoliated gasket may damage the electrode assembly in the battery.

In a battery disclosed in JP-Sho61(1986)-233965A, the opening edge portions of the peripheral wall of the seal can fitted onto the exterior can are shaped as a simple plate, providing relatively weak sealing, meaning a small compression force generated during fitting. On the contrary, in implementations where a stepped portion is formed on the peripheral wall of the seal can and the opening edge of the exterior can is fitted onto this stepped portion to increase the interior volume of the flat battery and improve the sealing, a very large compression force is applied in the direction of the cylinder axis of the seal can. Consequently, in such implementations, a portion of the gasket that is thinner than the other portions is very likely to exfoliate.

In view of this, an object of the present invention is to provide a flat battery with a gasket molded to extend from the opening edge of the seal can to the flat portion, where the gasket may be prevented from exfoliating from the inner surface of the seal can.

A flat battery according to an embodiment of the present invention includes: an exterior can shaped as a cylinder with a bottom; a seal can having a cylinder portion with an outer shape that is smaller than a sidewall of the exterior can and a flat portion that closes up one opening of the cylinder portion, the seal can being disposed as an inverted dish with respect to the exterior can to form a space between itself and the exterior can; and a gasket molded at least on an inner surface of the seal can, extending from an opening edge of the cylinder portion to the flat portion, wherein the cylinder portion of the seal can has a stepped portion at which an opening edge portion of the cylinder portion is expanded from a step, an opening edge of the sidewall of the exterior can is fitted onto the stepped portion of the seal can, and a portion of the gasket that is located inside the opening edge portion of the cylinder portion of the seal can with respect to the seal can has a thickness smaller than that of a portion of the gasket that is located inside the stepped portion of the seal can with respect to the seal can (first arrangement).

When the opening edge of the sidewall of the exterior can is fitted onto the stepped portion of the cylinder portion of the seal can, a compression force is applied to the gasket via the stepped portion, and the above configuration prevents a portion of the gasket located close to the flat portion of the seal can from exfoliating from the inner surface of the seal can due to that force. Specifically, part of the gasket is molded inside the cylinder portion of the seal can, and a portion of the gasket that is located inside the opening edge of the cylinder portion of the seal can with respect to the seal can has a smaller thickness than that of a portion of the gasket that is located inside the stepped portion of the seal can with respect to the seal can, such that a portion of the gasket close to the opening edge of the cylinder portion of the seal can has a comparatively small rigidity, and thus easy to deform. Thus, the force in a direction of compression applied to the gasket is absorbed by a portion of the gasket located close to the opening edge of the cylinder portion of the seal can, such that little of that force is transmitted to a portion of the gasket located close to the flat portion of the seal can. This will prevent a portion of the gasket located close to the flat portion of the seal can from exfoliating from the seal can.

In the first arrangement above, it is preferable that the gasket has an uneven portion located between the stepped portion and the opening edge of the cylinder portion inwardly with respect to the seal can such that the portion of the gasket that is located inside the opening edge portion of the cylinder portion with respect to the seal can has a smaller thickness than that of the portion of the gasket that is located inside the stepped portion with respect to the seal can (second arrangement).

Thus, a portion of the gasket located closer to the opening edge of the cylinder portion than the uneven portion is has a thickness that is smaller than that of a portion of the gasket located closer to the stepped portion of the seal can than the uneven portion is. Thus, the above arrangement will realize the first arrangement with greater certainty.

In the first or second arrangement above, it is preferable that the gasket is tapered such that a surface thereof located inwardly with respect to the seal can approaches the cylinder portion as it goes toward the opening edge of the cylinder portion (third arrangement).

Thus, once the gasket is molded, the mold may be easily extracted from inside the gasket, thereby improving workability in molding. Moreover, if components are disposed in the space formed between the exterior can and the seal can, the components may be easily disposed inside the gasket past the opening edge of the cylinder portion of the seal can, thereby improving workability in assembly of batteries.

In any one of the first to third arrangements, it is preferable that the seal can has a round portion on a peripheral edge of the flat portion for connecting the flat portion with the cylinder portion in a curved surface, and the gasket is provided such that a portion thereof that is located close to the flat portion of the seal can is in contact with the round portion and the flat portion (fourth arrangement).

If the opening edge of the sidewall of the exterior can is fitted onto the stepped portion of the cylinder portion of the seal can, a force in a direction of compression is applied to the gasket via the stepped portion; at this moment, the above arrangement will prevent a portion of the gasket located close to the flat portion of the seal can from exfoliating from the inner surface of the seal can. Specifically, a gasket molded on the inner side of the cylinder portion of the seal can, from the opening edge of the cylinder portion thereof to the flat portion, is provided such that the portion thereof close to the flat portion is in contact with the round portion and flat portion of the seal can. Thus, a portion of the gasket located close to the flat portion is prevented from moving inwardly with respect to the seal can by the portions of the gasket that are in intimate contact with the flat portion. This will prevent a portion of the gasket located close to the flat portion of the seal can from being deformed inwardly with respect to the seal can due to the force in a direction of compression applied to the gasket as described above. Thus, a portion of the gasket located close to the flat portion of the seal can is prevented from exfoliating from the inner surface of the seal can.

In the fourth arrangement above, it is preferable that the seal can has a round portion on a peripheral edge of the flat portion for connecting the flat portion with the cylinder portion in a curved surface, and the portion of the gasket located close to the flat portion of the seal can has a thickness that allows it to extend from the round portion to the flat portion of the seal can (fifth arrangement).

This makes it possible to prevent a portion of the gasket located close to the flat portion of the seal can from exfoliating from the seal can with greater certainty. Since the periphery of the flat portion of the seal can has a round portion, the edge of the gasket may exfoliate if the edge is located only at the round portion. Forming a gasket with a thickness that allows the edge of the gasket to reach the flat portion, as described above, will make it less likely that the edge exfoliates from the seal can.

In any one of the first to fifth arrangements above, it is preferable that an electrode assembly formed by stacking a positive electrode and a negative electrode, each shaped as a plate, in an alternating manner in a thickness direction is disposed in the space formed between the exterior can and the seal can (sixth arrangement).

In implementations where an electrode assembly is made of stacked positive and negative electrodes as described above, if a portion of the gasket molded on the inner surface of the seal can exfoliates, a short circuit may occur between the electrode assembly and the seal can. Using one of the first to fifth arrangements will effectively prevent a short circuit between the electrode assembly and the seal can.

In any one of the first to sixth arrangements, it is preferable that the gasket is formed outside the cylinder portion of the seal can so as to be sandwiched by the sidewall of the exterior can and the cylinder portion of the seal can when the exterior can and the seal can are combined with each other, and a portion of the gasket that is located outside the cylinder portion and close to the opening edge has a thickness smaller than that of a portion thereof that is located outside the cylinder portion and close to the stepped portion before the exterior can is fitted onto the seal can (seventh arrangement).

In implementations where the opening edge of the sidewall of the exterior can is fitted onto the stepped portion of the cylinder portion of the seal can, a portion of the gasket located close to the stepped portion is sandwiched by the seal can and the exterior can. This sandwiched portion of the gasket functions as a seal and isolation between the seal can and the exterior can. On the other hand, although a portion of the gasket located close to the opening edge of the cylinder portion of the seal can is located between the seal can and the exterior can, the extent to which this portion is compressed by the seal can and the exterior can is smaller than that for other portions.

As such, if a portion of the gasket located outside the cylinder portion of the seal can and close to the opening edge has a thickness smaller than that of a portion of the gasket located outside the cylinder portion of the seal can and close to the stepped portion before the exterior can is fitted onto the seal can, as described above, the amount of resin used for the gasket will be reduced without impairing the function of the gasket.

In the seventh arrangement above, it is preferable that the gasket is molded outside the cylinder portion of the seal can, extending from the opening edge portion of the cylinder portion to the stepped portion (eighth arrangement).

In this way, compared with implementations where a gasket is formed as a separate member, a portion of the gasket located close to the opening edge of the cylinder portion of the seal can may have a reduced thickness. This will reduce the amount of resin used for the gasket.

Thus, in a flat battery according to an embodiment of the present invention, the force applied to a gasket molded on the seal can when the exterior can is fitted onto the seal can may be absorbed by a portion of the gasket located close to the opening edge of the cylinder portion of the seal can. This will prevent a portion of the gasket located close to the flat portion of the seal can from exfoliating from the inner surface of the seal can.

Particularly, as a portion of the gasket located close to the opening edge of the cylinder portion and inwardly with respect to the seal can has a smaller thickness than that of a portion of the gasket located inside the stepped portion with respect to the seal can, the force generated when the exterior can is fitted onto the seal can may be absorbed by a portion of the gasket located close to the opening edge of the cylinder portion. This will prevent the gasket from exfoliating from the inner surface of the seal can with greater certainty.

Further, as the surface of the gasket located inwardly with respect to the seal can is tapered such that it approaches the cylinder portion of the seal can as it goes toward the opening edge of the cylinder portion, workability in molding a gasket and workability in assembly of batteries may be improved.

Furthermore, as a portion of the gasket located close to the flat portion of the seal can is in contact with the round portion and the flat portion, even when a force is applied to a gasket molded on the seal can when the exterior can is fitted onto the seal can, a portion of the gasket located close to the flat portion of the seal can may be prevented from exfoliating from the inner surface of the seal can. Particularly, as a portion of the gasket located close to the flat portion has a thickness that allows it to extend from the round portion to the flat portion, the gasket is prevented from exfoliating from the inner surface of the seal can with greater certainty.

Moreover, as a portion of a gasket located outside the cylinder portion of the seal can and close to its opening edge has a smaller thickness than that of a portion located outside the cylinder portion of the seal can and close to its stepped portion before the seal can is fitted onto the exterior can, the amount of resin used for the gasket may be reduced without impairing the function of the gasket. This may reduce the manufacturing cost of the gasket. Particularly, as a gasket is molded on the cylinder portion of the seal can, the thickness of the gasket may be further reduced.

EMBODIMENTS FOR CARRYING OUT THE INVENTION

Figure 1:
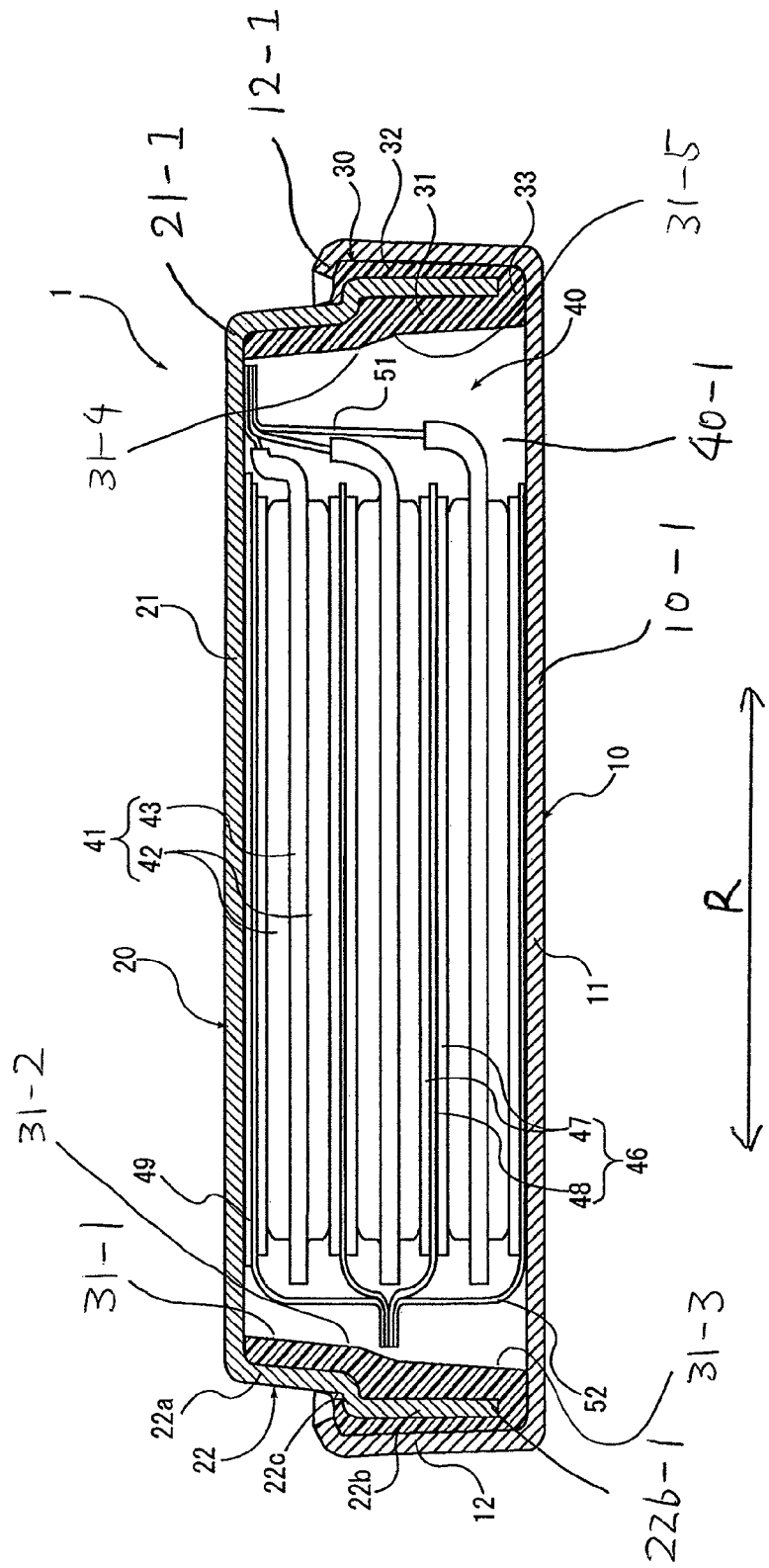
FIG. 1 is a schematic cross-sectional view of a flat battery according to an embodiment of the present invention.

Embodiments of the present invention will now be described in detail with reference to the drawings. The same or corresponding parts in the drawings are labeled with the same characters and their description will not be repeated.

(Overall Configuration)

FIG. 1 is a schematic cross-sectional view of a flat battery 1, an embodiment of the present invention. The flat battery 1 includes: a negative electrode can 10 that functions as an exterior can, shaped as a cylinder having a bottom; a positive electrode can 20 that functions as a seal can for covering the opening of the negative electrode can 10; a gasket 30 disposed between the periphery of the negative electrode can 10 and the periphery of the positive electrode can 20; and an electrode assembly 40 contained in the space formed between the negative electrode can 10 and positive electrode can 20. As such, the entire flat battery 1 is shaped like a flat coin as the negative electrode can 10 is combined with the positive electrode can 20. In addition to the electrode assembly 40, nonaqueous electrolyte (not shown) is enclosed in the space formed by the negative electrode can 10 and positive electrode can 20 of the flat battery 1.

The negative electrode can 10 is made of a metal material such as stainless steel, and is formed using press molding so as to be shaped as a cylinder having a bottom. The negative electrode can 10 includes a circular bottom 11 as well as a cylindrical peripheral wall (sidewall) 12 formed on the bottom's periphery to continue from the bottom 11. The peripheral wall 12 extends generally vertically from the peripheral edge of the bottom 11 as viewed in a vertical section (as shown in FIG. 1). As described below, the opening edge of the peripheral wall 12 of the negative electrode can 10 is bent inwardly and swaged onto the positive electrode can 20, where part of the gasket 30 is sandwiched between the negative electrode can and the positive electrode can 20. The negative electrode can 10 has a round portion with a curved surface in a location where the can is bent by press molding (for example, between the bottom 11 and the peripheral wall 12).

Similar to the negative electrode can 10, the positive electrode can 20 is made of a metal material such as stainless steel, and is formed using press molding so as to be shaped as a cylinder having a bottom. The positive electrode can 20 includes a cylindrical peripheral wall (cylinder portion) 22 with an outer shape that is smaller than the peripheral wall 12 of the negative electrode can 10, and a circular flat portion 21 that closes up one of its openings. As in the negative electrode can 10, the peripheral wall 22 extends generally vertically with respect to the flat portion 21 as viewed in a vertical section. The peripheral wall 22 has an outspread portion 22b, defined by a step, with a larger diameter than the base edge portion 22a, which is close to the flat portion 21. In other words, the peripheral wall 22 has a stepped portion 22c formed between the base edge portion 22a and the outspread portion 22b. As shown in FIG. 1, the opening edge of the peripheral wall 12 of the negative electrode can 10 is bent and swaged onto the stepped portion 22c. That is, the opening edge of the peripheral wall 12 of the negative electrode can 10 is fitted onto the stepped portion 22a of the positive electrode can 20. The positive electrode can 20 also has a round portion with a curved surface in a location where the can is bent by press molding (for example, between the flat portion 21 and the peripheral wall 22, or at the stepped portion 22c).

The gasket 30 is made of polypropylene (PP). The gasket 30 is molded on the peripheral wall 22 of the positive electrode can 20 so as to be partially sandwiched between the peripheral wall 12 of the negative electrode can 10 and the peripheral wall 22 of the positive electrode can 20. The configuration of the gasket 30 will be described in detail below. It should be noted that the material of the gasket 30 is not limited to PP, and may be a resin composition with polyphenylene sulfide (PPS) containing an olefinic elastomer, polytetrafluoroethylene (PFA), a polyamide-based resin or the like.

Figure 2:
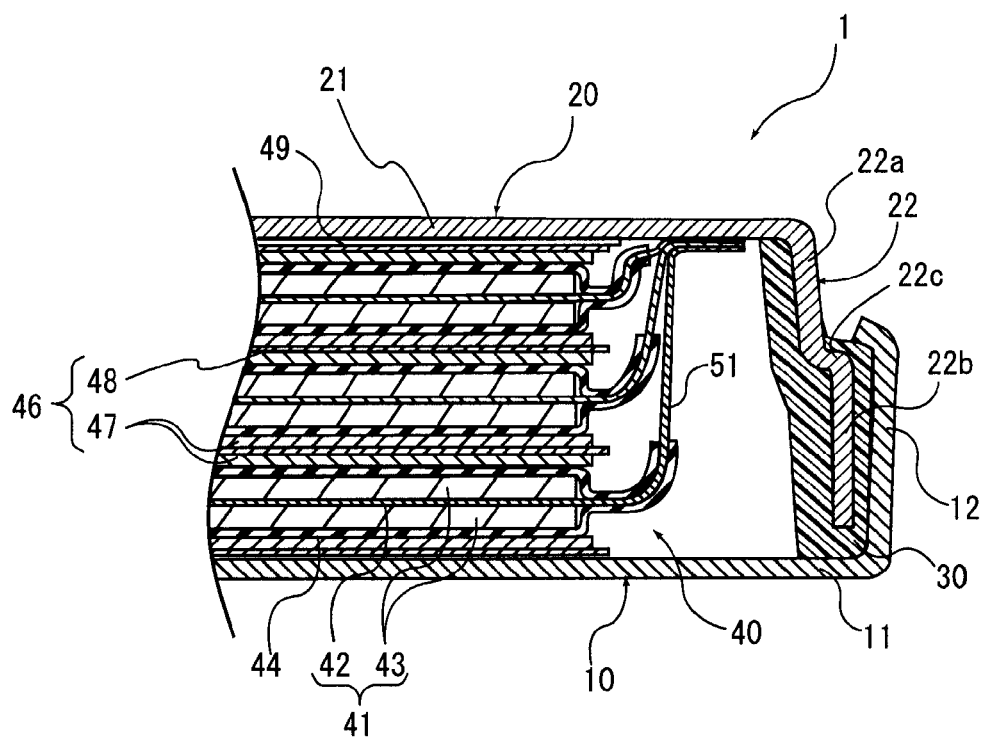
FIG. 2 is a partial enlarged cross-sectional view of the electrode assembly in the flat battery.

As shown also in FIG. 2, the electrode assembly 40 includes positive electrodes 41, each shaped as a generally circular plate and contained in a separator 44 bag, and negative electrodes 46, each shaped as a generally circular plate, all stacked on top of each other in their thickness direction in an alternating manner. Thus, the electrode assembly 40 as a whole is generally shaped as a cylinder. In the electrode assembly 40, positive electrodes 41 and negative electrodes 46 are stacked on top of each other such that each end surface of the assembly is formed by a negative electrode.

Each positive electrode 41 is formed by providing a positive electrode active material layer 42 containing a positive electrode active material such as lithium cobalt oxide on each side of a positive electrode current collector 43 made of metal foil such as aluminum.

Each negative electrode 46 is formed by providing a negative electrode active material layer 47 containing a negative electrode active material such as graphite on each side of a negative electrode current collector 48 made of metal foil such as copper. The negative electrodes at the two ends of the generally cylindrical electrode assembly 40 in the axial direction each have a negative electrode active material layer 47 only on one side of the negative electrode current collector 48 such that the negative electrode current collectors 48, 48 are located at the ends of the electrode assembly 40 in the axial direction. In other words, the generally cylindrical electrode assembly 40 has negative electrode current collectors 48, 48 exposed at their respective ends of the assembly. One of these negative electrode current collectors 48 of the electrode assembly 40 abuts the bottom 11 of the negative electrode can 10 as the electrode assembly 40 is disposed between the negative electrode can 10 and the positive electrode can 20. The other negative electrode current collector 48 of the electrode assembly 40 is located on the flat portion 21 of the positive electrode can 20, with an insulating sheet 49 interposed therebetween.

Each separator 44 is a bag-like member that is circular in a planar view, and has a size that allows it to contain a positive electrode 41, also shaped as a generally circular plate. The separator 44 is formed of microporous thin film made of polyethylene with good insulation properties. As the separators 44 are formed of microporous thin film, lithium ions can penetrate the separators 44. Each separator 44 is formed by wrapping a positive electrode 41 in one rectangular sheet of a microporous thin film and causing portions of the sheet overlying each other to adhere to each other using heat welding, for example.

A conductive positive electrode lead 51 is formed integrally with the positive electrode current collector 43 of each positive electrode 41, the lead extending toward the outside of the positive electrode current collector 43 in a planar view. A portion of the positive electrode lead 51 close to the positive electrode current collector 43 is covered with its respective separator 44.

A conductive negative electrode lead 52 is formed integrally with the negative electrode current collector 48 of each negative electrode 46, extending toward the outside of the negative electrode current collector 48 in a planar view.

As shown in FIG. 1, the positive electrodes 41 and negative electrodes 46 are stacked on top of each other such that the positive electrode leads 51 of the positive electrodes 41 are positioned on one side, while the negative electrode leads 52 of the negative electrodes 46 are positioned on the side opposite that for the positive electrode leads 51.

With the positive electrodes 41 and negative electrodes 46 being stacked on top of each other in their thickness direction as described above, the tips of the positive electrode leads 51 are placed upon each other in their thickness direction and are then connected with the flat portion 21 of the positive electrode can 20 using ultrasonic welding, for example. Thus, the positive electrodes 41 are electrically connected with the flat portion 21 of the positive electrode can 20 via the positive electrode leads 51. Similarly, the tips of the negative electrode leads 52 are placed upon each other in their thickness direction and are then connected with each other using ultrasonic welding, for example. Thus, the negative electrodes 46 are electrically connected with each other via the negative electrode leads 52.

In an electrode assembly 40 with such a configuration, connection may occur between a positive electrode 41 and the negative electrode can 10 or between a negative electrode 46 and the positive electrode can 20. In view of this, in the present embodiment, as shown in FIGS. 1 and 2, a gasket 30 is provided on the inner surface of the peripheral wall 22 of the positive electrode can 20, which is located inside the peripheral wall 12 of the negative electrode can 10. The gasket 30 prevents a short circuit between the electrode assembly 40 and the negative electrode can 10 as well as a short circuit between the electrode assembly 40 and the positive electrode can 20.

(Configuration of Gasket)

Figure 3:
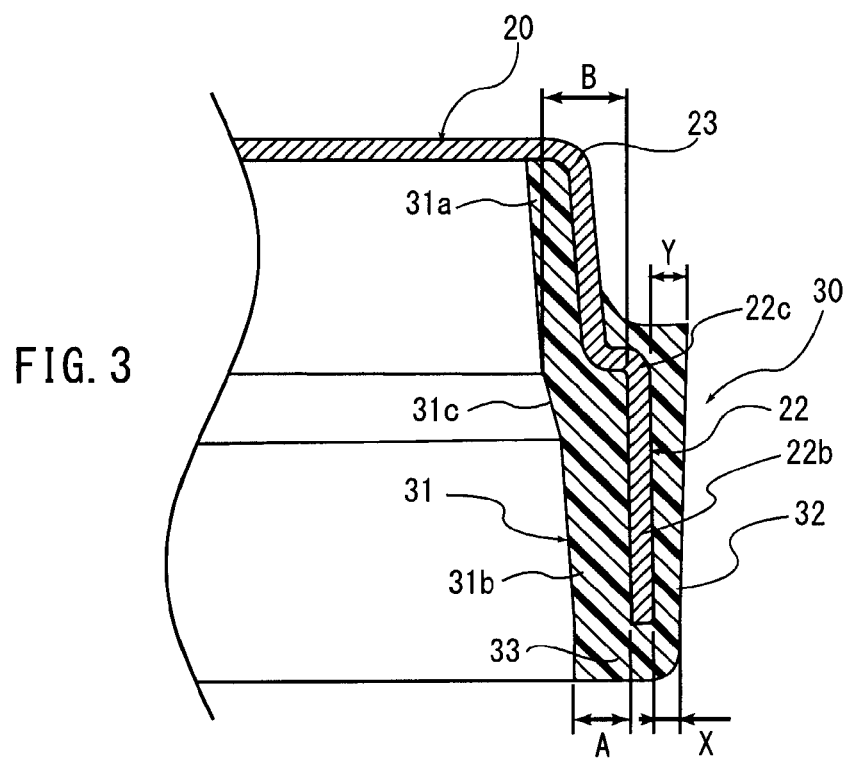
FIG. 3 is a partial enlarged cross-sectional view of the peripheral wall of the seal can (positive electrode can).

As shown in FIGS. 1 to 3, the gasket 30 is generally cylindrical so as to wrap the peripheral wall 22 of the positive electrode can 20. Specifically, the gasket 30 is molded on the positive electrode can 20 to cover the inner side of the peripheral wall 22 with respect to the positive electrode can and the outer side of the stepped portion 22c and outspread portion 22b of the peripheral wall 22 with respect to the positive electrode can. In other words, the gasket 30 includes an inner gasket portion 31 covering the inner side of the peripheral wall 22 with respect to the positive electrode can, an outer gasket portion 32 covering the outer side of the peripheral wall 22, and a gasket edge portion 33 covering the very edge of the opening edge of the peripheral wall 22.

As shown in the enlarged view of FIG. 3, the outer gasket portion 32 has a thickness that becomes smaller as it goes toward the opening edge of the peripheral wall 22 of the positive electrode can 20 before the negative electrode can 10 is swaged onto the positive electrode can 20. Specifically, a portion of the outer gasket portion 32 close to the opening edge of the peripheral wall 22 ("X" in FIG. 3) has a smaller thickness than that of a portion of the outer gasket portion 32 close to the stepped portion 22c of the peripheral wall 22 ("Y" in FIG. 3). In other words, in the present embodiment, a portion of the gasket 30 that need not be very thick has a reduced thickness. This will reduce the amount of resin needed to form the gasket 30. Thus, the above arrangement will reduce the manufacturing cost of the gasket 30 while maintaining the function of the gasket 30.

As shown in FIGS. 1 and 2, a portion of the outer gasket portion 32 located close to the stepped portion 22c of the peripheral wall 22 is compressed by the opening edge of the peripheral wall 12 of the negative electrode can 10 when the negative electrode can 10 is swaged onto the positive electrode can 20. Thus, the gap between the negative electrode can 10 and the positive electrode can 20 is sealed by a portion of the outer gasket portion 32 located close to the stepped portion 22c of the peripheral wall 22. On the contrary, although a portion of the outer gasket portion 32 located close to the opening edge of the peripheral wall 22 is located between the peripheral wall 12 of the negative electrode can 10 and the peripheral wall 22 of the positive electrode can 20, this portion is not compressed sufficiently between the negative electrode can 10 and the positive electrode can 20 to function as a seal. As such, as a portion of the outer gasket portion 32 located close to the opening edge of the peripheral wall 22 has a thickness that is reduced to a level that still allows it to function as an insulator, the material cost of the gasket 30 may be reduced accordingly and, if the outer size of the flat battery 1 remains the same, the capacity of the battery may be increased.

As shown in FIG. 1, with the peripheral wall 12 of the negative electrode can 10 swaged onto the peripheral wall 22 of the positive electrode can 20, the gasket edge portion 33 is sandwiched between the opening edge of the peripheral wall 22 of the positive electrode can 20 and the bottom 11 of the negative electrode can 10.

Thus, a portion of the outer gasket portion 32 located close to the stepped portion 22c of the peripheral wall 22 and the gasket edge portion 33 function as a seal for isolating, from the outside space, the space formed between the positive electrode can 20 and the negative electrode can 10.

As shown in FIG. 3, the inner gasket portion 31 is generally cylindrical, extending from the lower surface of the flat portion 21 of the positive electrode can 20 to the vicinity of the opening edge of the peripheral wall 22 of the positive electrode can 20. As such, the inner gasket portion 31 includes an upper gasket portion 31a located inside the base edge portion 22a of the peripheral wall 22 with respect to the positive electrode can and a lower gasket portion 31b located inside the stepped portion 22c and outspread portion 22b of the peripheral wall 22 with respect to the positive electrode can. The inner gasket portion 31 as a whole is tapered such that its inner diameter becomes larger, i.e. the inner surface approaches the peripheral wall 22, as it goes toward the vicinity of the opening edge of the peripheral wall 22 of the positive electrode can 20.

Figure 4:
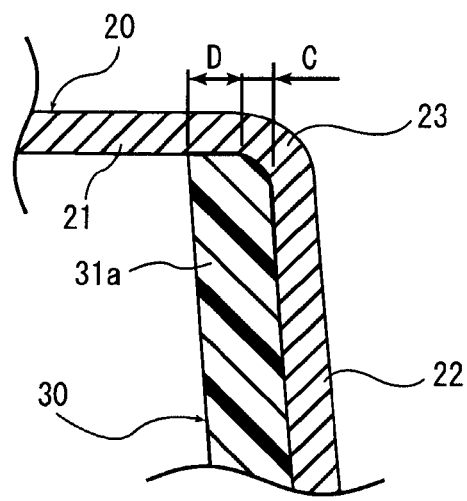
FIG. 4 is a partial enlarged cross-sectional view of a round portion of the seal can (positive electrode can).

The upper gasket portion 31a is formed with a thickness that allows the edge of the gasket located close to the flat portion of the positive electrode can 20 to extend from the round portion 23 between the flat portion 21 and the peripheral wall 22 to the flat portion 21. Specifically, as shown in FIG. 4, the edge of the upper gasket portion 31a located close to the flat portion has a portion C that is in intimate contact with the round portion 23 and a portion D that is in intimate contact with the flat portion 21. Thus, even when the lower gasket portion 31b is compressed when the peripheral wall 12 of the negative electrode can 10 is swaged onto the stepped portion 22c of the peripheral wall 22 of the positive electrode can 20 and a force is applied to the upper gasket portion 31a in a direction that causes it to exfoliate from the inner surface of the positive electrode can 20, the portion D of the upper gasket portion 31a that is in intimate contact with the flat portion 21 prevents the upper gasket portion 31a from exfoliating from the inner surface of the positive electrode can.

If the upper gasket portion 31a were only in intimate contact with the round portion 23, the upper gasket portion 31a would only be held by the intimate contact between the upper gasket portion 31a and the inner surface of the positive electrode can 20. On the contrary, if the upper gasket portion 31a is also in intimate contact with the flat portion 21 at the portion D, as described above, the upper gasket portion 31a is also held by the intimate contact and frictional force between the upper gasket portion 31a and the flat portion 21. This will prevent the upper gasket portion 31a from moving so as to exfoliate from the positive electrode can 20.

As shown in FIG. 3, the lower gasket portion 31b is formed such that its inner surface is located more outward in a radial direction of the positive electrode can 20 than the inner surface of the upper gasket portion 31a. That is, a portion of the lower gasket portion 31b that is close to the upper gasket portion has an inner uneven portion (uneven portion) 31c such that the diameter of the inner surface of the upper gasket portion 31a is larger than the diameter of the inner surface of the lower gasket portion 31b. The inner uneven portion 31c is tapered such that its inner diameter gradually increases from the upper gasket portion 31a toward the lower gasket portion 31b. The inner uneven portion 31c is located between the stepped portion 22c and opening edge of the outspread portion 22b of the peripheral wall 22 of the positive electrode can 20. Thus, as shown in FIG. 3, a portion of the lower gasket portion 31b located inside the outspread portion 22b with respect to the positive electrode can ("A" in FIG. 3) has a smaller thickness than that of a portion of the lower gasket portion located inside the stepped portion 22c with respect to the positive electrode can ("B" in FIG. 3).

Due to this configuration, during manufacture of a flat battery 1, when the opening edge of the peripheral wall 12 of the positive electrode can 10 is swaged onto the stepped portion 22c of the positive electrode can 20, the compression force generated by this swaging may be absorbed by the lower gasket portion 31b. Specifically, as described in detail below, when swaging the negative electrode can 10 onto the positive electrode can 20 applies a compression force to the stepped portion 22c of the positive electrode can 20, a compression force also acts on the lower gasket portion 31b via the stepped portion 22c. At this moment, a portion of the lower gasket portion 31b that has a smaller thickness than the portion of the gasket located inside the stepped portion 22c with respect to the positive electrode can (i.e. the inner uneven portion 31c in this embodiment), i.e. a portion of the gasket located inside the outspread portion 22b with respect to the positive electrode can is deformed. Thus, the force acting on the lower gasket portion 31b when the negative electrode can 10 and the positive electrode can 20 are fitted onto each other may be absorbed by the lower gasket portion 31b.

Thus, the force acting on the lower gasket portion 31b when the negative electrode can 10 is swaged onto the positive electrode can 20 may be prevented from being transmitted to the upper gasket portion 31a. Thus, the upper gasket portion 31a may be prevented from exfoliating from the positive electrode can 20 due to the deformation of the upper gasket portion 31a.

As described above, the upper gasket portion 31a is provided to be adherent to the flat portion 21 of the positive electrode can 20. Thus, even when a force acts on the upper gasket portion 31a in a direction that causes it to exfoliate from the inner surface of the positive electrode can 20, the adhesion and frictional force between the upper gasket portion 31a and the flat portion 21 may prevent the upper gasket portion 31a from exfoliating from the inner surface of the positive electrode can 20.

(Method of Manufacturing a Flat Battery)

Now, a method of manufacturing a flat battery 1 with the configuration described above will be described with reference to FIGS. 5 to 8.

Figure 5:
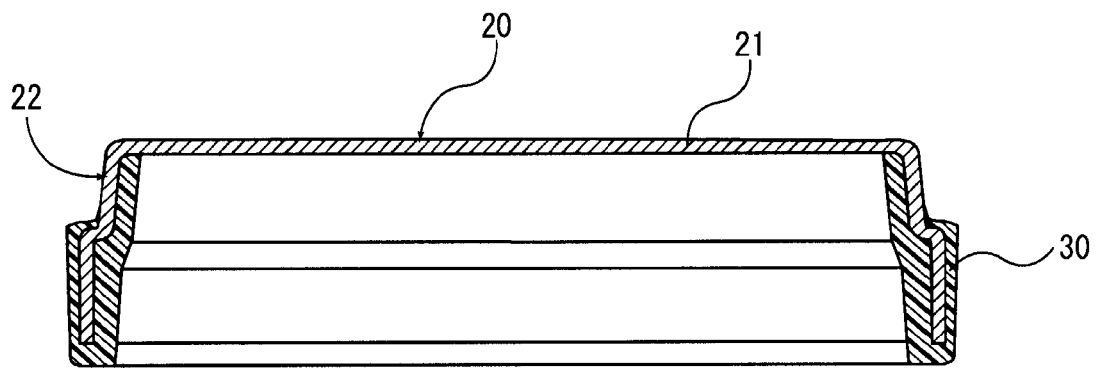
FIG. 5 is a schematic cross-sectional view of a seal can (positive electrode can).
Figure 7:
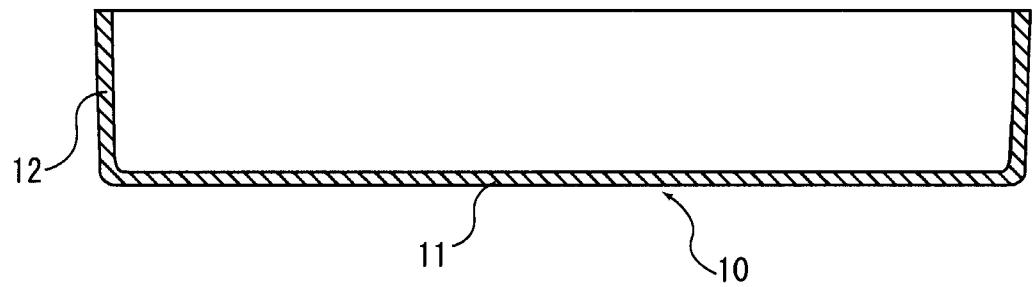
FIG. 7 is a cross-sectional view of an exterior can (negative electrode can) before it is swaged onto a seal can (positive electrode can).

First, a negative electrode can 10 shown in FIG. 7 and a positive electrode can 20 shown in FIG. 5 are formed using press molding.

Figure 6:
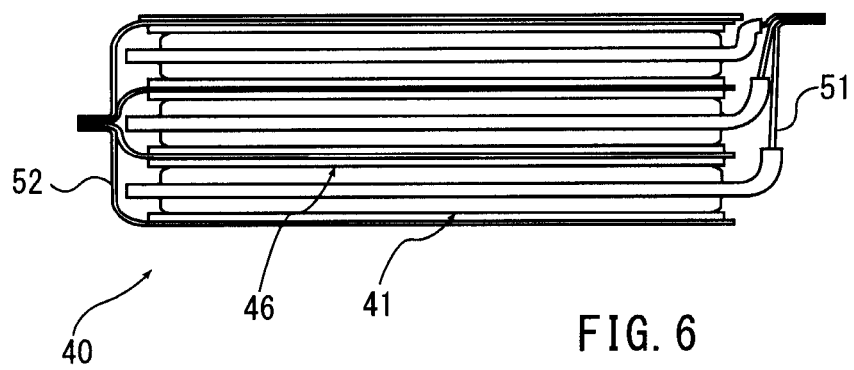
FIG. 6 is a view of a constructed electrode assembly.

Meanwhile, positive electrode 41 plates, each covered with a separator 44, and negative electrode 46 plates are stacked on top of each other in their thickness direction to form a generally cylindrical electrode assembly 40, as shown in FIG. 6. Here, a negative electrode having a face without a negative electrode active material layer 47 is disposed on each end face of the electrode assembly 40 in its axial direction such that the respective negative electrode current collectors 48 are exposed. With the positive electrodes 41 and negative electrodes 46 stacked on top of each other, the tips of the negative electrode leads 52 of the negative electrodes 46 are placed upon each other and are then connected with each other using ultrasonic welding or the like. Meanwhile, the tips of the positive electrode leads 51 of the positive electrodes 41 are placed upon each other and are then connected, using ultrasonic welding or the like, with the flat portion 21 of the positive electrode can 20, on which a gasket 30 has been molded, as will be described below.

How a gasket 30 may be molded on a positive electrode can 20 will be described with reference to FIG. 8.

Figure 8:
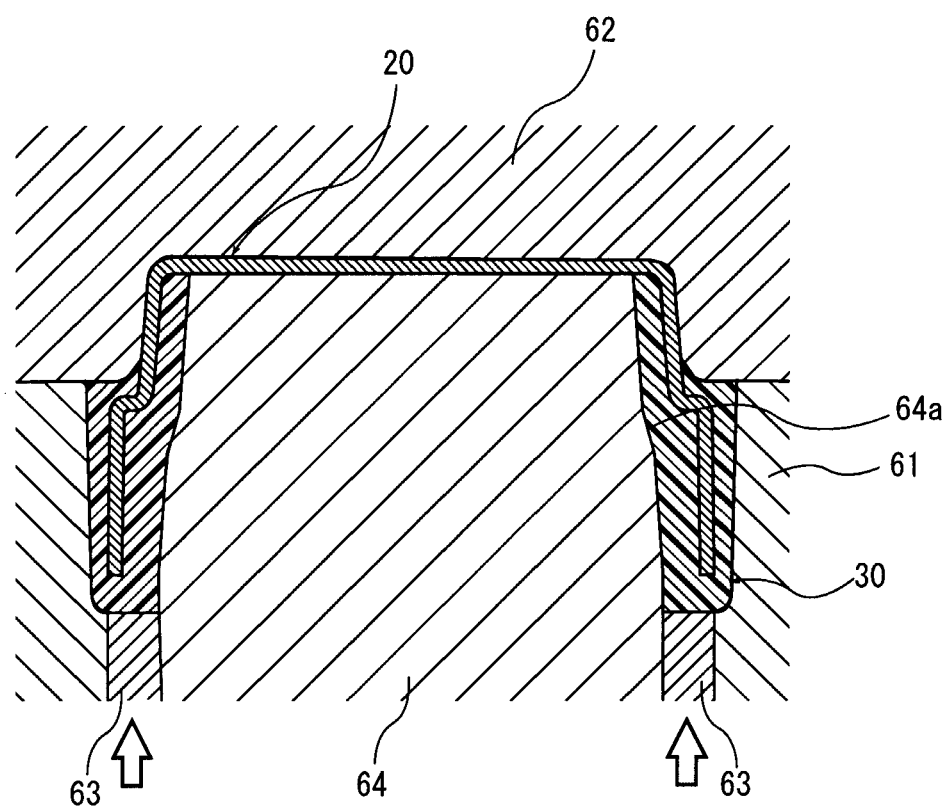
FIG. 8 illustrates how a gasket may be molded on a seal can (positive electrode can).

As shown in FIG. 8, a fixed mold 61, a movable mold 62 and a piston-movable mold 63 with a ring-shaped cross section are positioned outside the positive electrode can 20, and a pin 64 is positioned inside the positive electrode can 20. Thus, a space in which a gasket 30 may be formed is formed around the peripheral wall 22 of the positive electrode can 20 by the molds 61, 62 and 63 and pin 64. Resin is injected into this space from the outside and is hardened.

Once the resin is hardened and a gasket 30 is formed, the movable mold 62 is first removed. Then, as the piston-movable mold 63 is moved in an axial direction of the pin 64 (i.e. the direction of the hollow arrow in FIG. 8), the positive electrode can 20 with a molded gasket 30 may be removed from the pin 64 and fixed mold 61.

A portion of the fixed mold 61 that may be used to mold the peripheral surface of the outer gasket portion 32 is tapered such that the inner diameter gradually increases as it goes toward the stepped portion 22c of the peripheral wall 22 of the positive electrode can 20. Thus, when the gasket edge portion 33 is pushed by the piston-movable mold 63, as described above, the positive electrode can 20 may be easily removed from the fixed mold 61.

An uneven portion 64a is formed on the outer surface of the pin 64 to correspond to the inner uneven portion 31c of the inner gasket portion 31. The pin 64 is tapered toward the tip so as to cause the inner diameter of the inner gasket portion 31 to gradually increase as it goes toward the opening edge of the peripheral wall 22 of the positive electrode can 20. Thus, the positive electrode can 20 may be removed smoothly from the pin 64.

The positive electrode can 20, on which a gasket 30 has been molded as described above, is now positioned such that the flat portion 21 is located at the bottom, and the positive electrode leads 51 of the positive electrodes 41, as placed upon each other, are connected with the flat portion 21 using ultrasonic welding or the like. Thereafter, nonaqueous electrolyte is injected into the positive electrode can 20. Then, the negative electrode can 10 is placed on the positive electrode can 20 to cover its opening. Thereafter, the opening edge of the peripheral wall 12 of the negative electrode can 10 is bent inward to the stepped portion 22c of the peripheral wall 22 of the positive electrode can 20 for swaging. Thus, a flat battery 1 with the configuration described above is provided. The nonaqueous electrolyte may be obtained by, for example, mixing ethylene carbonate and methyl ethyl carbonate to provide a solvent and dissolving $LiPF_6$ in this solvent.

As described above, a large force is applied to the stepped portion 22c when the opening edge of the peripheral wall 12 of the negative electrode can 10 is swaged onto the stepped portion 22c of the peripheral wall 22 of the positive electrode can 20. Thus, a large compression force is applied to the lower gasket portion 31b via the stepped portion 22c. However, as described above, a portion of the lower gasket portion 31b that is inside the opening edge of the outspread portion 22b with respect to the positive electrode can ("A" in FIG. 3) has a smaller thickness than that of a portion of the gasket that is inside the stepped portion 22c of the positive electrode can 20 with respect to the positive electrode can ("B" in FIG. 3), allowing the portion with a smaller thickness to be deformed to effectively absorb the compression force.

Thus, when the lower gasket portion 31b is compressed, as described above, the force may be prevented from being transmitted to the upper gasket portion 31a. Thus, the upper gasket portion 31a may be prevented from exfoliating from the inner surface of the positive electrode can 20.

Moreover, a portion of the upper gasket portion 31a close to the flat portion of the positive electrode can 20 is formed to have a thickness that allows it to reach not only the round portion 23 but also the flat section of the flat portion 21. Thus, even when a force that can cause the upper gasket portion 31a to come apart from the peripheral wall 22 of the positive electrode can 20 acts on that portion, the adhesion and frictional force between the upper gasket portion 31a and the flat section of the flat portion 21 may prevent the upper gasket portion 31a from exfoliating from the inner surface of the positive electrode can 20. In other words, the upper gasket portion 31a is less likely to exfoliate from the inner surface of the positive electrode can 20 than would be the case when the upper gasket portion 31a were only adherent to the round portion 23.

In implementations where the positive electrodes 41 of the electrode assembly 40 are each covered with a separator 44 and the negative electrodes 46 are exposed where the seal can functions as a positive electrode can 20, as in the present embodiment, a short circuit is likely to occur between the positive electrode can 20 and a negative electrode 46 if the upper gasket portion 31a provided on the inner surface of the positive electrode can 20 exfoliates.

However, as a gasket 30 is configured such that the upper gasket portion 31a is less likely to exfoliate from the inner surface of the positive electrode can 20, as described above, a short circuit may be prevented from occurring between the positive electrode can 20 and the electrode assembly 40.

Further, as the upper gasket portion 31a is less likely to exfoliate from the inner surface of the positive electrode can 20, as described above, damage to the electrode assembly 40 by an exfoliated upper gasket portion 31a may be prevented.

Furthermore, in the present embodiment, before the negative electrode can 10 is swaged onto the positive electrode can 20, a portion of the outer gasket portion 32 located close to the opening edge of the peripheral wall 22 of the positive electrode can 20 has a smaller thickness than that of a portion of the outer gasket portion located close to the stepped portion 22c of the peripheral wall 22. In other words, in the present embodiment, a portion of the gasket 30 that need not be very thick has a reduced thickness. This will reduce the amount of resin needed to form the gasket 30. Consequently, the above configuration may reduce the manufacturing cost of the gasket 30 while maintaining the function of the gasket 30.

Moreover, in the present embodiment, a portion of the lower gasket portion 31b of the inner gasket portion 31 that is located inside the opening edge of the outspread portion 22b with respect to the positive electrode can ("A" in FIG. 3) has a smaller thickness than that of a portion of the gasket that is located inside the stepped portion 22c of the positive electrode can 20 with respect to the positive electrode can ("B" in FIG. 3). This will reduce the amount of resin forming the inner gasket portion 31.

Further, as the inner surface of the inner gasket portion 31 is tapered such that the inner diameter gradually increases as it goes toward the opening edge of the peripheral wall 22, the amount of resin forming the gasket 31 will be further reduced.

As one embodiment as shown in FIG. 1, the exterior can 10 has an inside space 40-1. The exterior can has a cylinder with a bottom 10-1. The seal can 20 includes a flat portion 21 having a peripheral edge 21-1. An opening edge portion 22b-1 is located at a lower edge of the second cylinder portion 22b. The opening edge 12-1 of the sidewall of the exterior can is engaged with the stepped portion 22c of the seal can. The gasket has an inner surface 31-1. The inner surface 31-1 has a first angle 31-4 and a second angle 31-5 between a first portion 31-2 and a second portion 31-3. The first angle 31-4 and the second angle 31-5 can constitute an uneven portion. The first portion 31-2 corresponds to a part of the inner surface at the same level in the radial direction "R" of the stepped portion 22c. The second portion 31-3 corresponds to a part of the inner surface at the same level in the radial direction of the opening edge portion 22b-1.

Other Embodiments

While an embodiment of the present invention has been described, the described embodiment is only an illustrative example that can be used to carry out the present invention. Thus, the present invention is not limited to the embodiment described above, and the above embodiment may be modified as necessary as long as it does not depart from the spirit of the invention.

In the above embodiment, a portion of the upper gasket portion 31a located close to the flat portion of the positive electrode can 20 has a thickness that allows it to extend from the round portion 23 to the flat section of the flat portion 21. However, a portion of the upper gasket portion 31a located close to the flat portion of the positive electrode can 20 may have a thickness that only allows it to cover the round portion 23.

In the above embodiment, the electrode assembly 40 includes positive electrodes 41 and negative electrodes 46 stacked on top of each other in an alternating manner; however, the electrode assembly may have other configurations.

In the above embodiment, the negative electrode can 10 is formed by an exterior can and the positive electrode can 20 is formed by a seal can; conversely, the negative electrode can may formed by be a seal can and the positive electrode can may be formed by an exterior can.

In the above embodiment, the negative electrode can 10 and positive electrode can 20 are each shaped as a cylinder with a bottom, and the flat battery 1 is shaped as a coin; however, the present invention is not limited to this arrangement, and the flat battery may be in other shapes than a cylinder, such as a polygonal column.

In the above embodiment, the positive electrode can as a seal can is made of stainless steel; however, the present invention is not limited to this arrangement, and the positive electrode can may be made of a clad material formed by stacking a plate of aluminum and a plate of stainless steel on top of each other and joining them to each other. In such an implementation, aluminum is positioned on the inner surface of the positive electrode can. Thus, a positive electrode lead 51 made of aluminum may be joined to aluminum on the inner surface of the positive electrode can. Moreover, since the peripheral wall of the positive electrode can is covered with the peripheral wall of the negative electrode can, aluminum positioned on the inner side of the positive electrode can may be prevented from being exposed and corroded.

INDUSTRIAL APPLICABILITY

The flat battery of the present invention is usable as a flat battery with a gasket molded on its seal can.

The invention claimed is:

1. A flat battery shaped in a coin extending in a radial direction, comprising:
    an exterior can having a cylinder with a bottom, the cylinder having a sidewall, and an opening edge provided on one end of the cylinder, the bottom provided on the other end of the cylinder;
    a seal can having a space formed therein, the seal can comprising:
        a flat portion having a peripheral edge;
        a first cylinder portion downward extended from the peripheral edge;
        a stepped portion below the first cylinder portion;
        a second cylinder portion below the stepped portion, the second cylinder portion extending straight downward, the second cylinder portion having a radius larger than that of the first cylinder portion;
        an opening edge portion located at a lower edge of the second cylinder portion extending straight downward; and
        the space formed between the flat portion and the bottom, wherein the second cylinder portion of the seal can is fitted within the sidewall of the exterior can such that the opening edge of the sidewall of the exterior can is engaged with the stepped portion of the seal can,
    a gasket molded between the second cylinder portion and the sidewall, the gasket extending inside the seal can around the opening edge portion extended to the flat portion,
    wherein the gasket has an inner surface exposing to the space,
    wherein the inner surface has a first angle and a second angle below the first angle, wherein the first angle is convex to the space, and the second angle is concave to the space,
    wherein both of the first angle and the second angle are located between a first portion and a second portion, the first portion corresponding to a part of the inner surface at the same level in the radial direction of the stepped portion, the second portion corresponding to a part of the inner surface at the same level in the radial direction of the opening edge portion,
    wherein the thickness of the gasket between the opening edge portion and the second portion is smaller than the thickness of the gasket in the radial direction between the second cylinder portion and the second portion.

2. The flat battery according to claim 1, wherein:
in the radial direction inside the seal can, the gasket is tapered such that a surface thereof approaches the second cylinder portion as it goes toward the opening edge portion.

3. The flat battery according to claim 1, wherein:
the seal can has a round portion on the peripheral edge of the flat portion for connecting the flat portion with the first cylinder portion in a curved surface, and
wherein inside the seal can, the gasket contacts the flat portion and the round portion.

4. The flat battery according to claim 3, wherein:
the portion of the gasket located close to the flat portion of the seal can has a thickness that allows it to extend from the round portion to the flat portion of the seal can.

5. The flat battery according to claim 1, wherein:
an electrode assembly formed by stacking a positive electrode and a negative electrode, each shaped as a plate, in an alternating manner in a thickness direction is disposed in the space formed between the exterior can and the seal can.

6. The flat battery according to claim 1, wherein:
the gasket is formed outside the second cylinder portion of the seal can so as to be sandwiched by the sidewall of the exterior can and the second cylinder portion of the seal can when the exterior can and the seal can are combined with each other, and
a portion of the gasket that is located outside the second cylinder portion and close to the opening edge portion has a thickness smaller than that of a portion thereof that is located outside the second cylinder portion and close to the stepped portion before the exterior can is fitted onto the seal can.

7. The flat battery according to claim 6, wherein:
the gasket is molded outside the second cylinder portion of the seal can, extending from the opening edge portion of the cylinder portion to the stepped portion.

8. The flat battery according to claim 1, wherein:
the gasket inside the seal can has an uneven portion located between the stepped portion and the opening edge portion of the cylinder portion,
wherein in the radial direction inside the seal can, the portion of the gasket that is located inside the opening edge portion of the cylinder portion has a smaller thickness than that of the portion of the gasket that is located inside second cylinder portion just below the stepped portion.

9. The flat battery according to claim 1, wherein the first angle and the second angle constitute an uneven portion.

* * * * *